(12) United States Patent
Phillips

(10) Patent No.: US 8,409,046 B2
(45) Date of Patent: Apr. 2, 2013

(54) MULTI-SPEED TRANSMISSION WITH EXTERNAL DRIVE GEARSETS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 178 days.

(21) Appl. No.: 12/972,130

(22) Filed: Dec. 17, 2010

(65) Prior Publication Data

US 2012/0157259 A1     Jun. 21, 2012

(51) Int. Cl.
*F16H 3/44*     (2006.01)

(52) U.S. Cl. .......................................... 475/284; 475/296

(58) Field of Classification Search ................... 475/284, 475/296
See application file for complete search history.

(56) References Cited

U.S. PATENT DOCUMENTS

| | | | | |
|---|---|---|---|---|
| 5,584,775 A | * | 12/1996 | Miura et al. | 475/200 |
| 7,169,074 B2 | * | 1/2007 | Raghavan et al. | 475/5 |
| 7,637,839 B2 | * | 12/2009 | Hiraiwa | 475/284 |

* cited by examiner

*Primary Examiner* — Edwin A Young

(57) ABSTRACT

A transmission is provided having an input member, an output member, three planetary gear sets, two external gear sets or sprocket sets, a plurality of coupling members and a plurality of torque transmitting devices. Each of the planetary gear sets includes first, second and third members. Each of the external gear sets includes first and second members. The torque transmitting devices include clutches and brakes.

20 Claims, 4 Drawing Sheets

| GEAR STATE | GEAR RATIO | RATIO STEP | CLUTCHING ELEMENTS | | | | | |
|---|---|---|---|---|---|---|---|---|
| | | | 42; 242 | 40; 240 | 36 OR 39; 236 | 34; 234 | 38; 238 | 32; 232 |
| REV | -3.648 | | X | | X | | | X |
| N | | -0.83 | | | | | | |
| 1ST | 4.405 | | X | | | | X | X |
| 2ND | 2.665 | 1.65 | | X | | | X | X |
| 3RD | 1.805 | 1.48 | | | X | | X | X |
| 4TH | 1.224 | 1.48 | | | | X | X | X |
| 5TH | 1.000 | 1.22 | | | X | X | X | |
| 6TH | 0.819 | 1.22 | | | X | X | | X |
| 7TH | 0.764 | 1.07 | | X | X | X | | |
| 8TH | 0.669 | 1.14 | | X | | X | | X |

X = ON - ENGAGED CARRYING TORQUE

FIG. 7

MULTI-SPEED TRANSMISSION WITH EXTERNAL DRIVE GEARSETS

FIELD

The present invention relates generally to a multiple speed transmission having a plurality of gear sets and a plurality of torque transmitting devices, and more particularly to a transmission having eight or more speeds produced by a combination of planetary gear sets, external gear sets and torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, two planetary gear sets, three external or co-planar gear sets, a plurality of coupling members and a plurality of torque transmitting devices. Each of the planetary gear sets includes first, second and third members. Each of the external gear sets includes first and second members that are either gears or sprockets. The external gear sets are co-planar intermeshing gears. The torque transmitting devices are for example clutches and brakes.

In another embodiment of the transmission, the first, second and third external gear sets each have a first sprocket and a second sprocket coupled by a chain or belt.

In yet another embodiment of the transmission, the first and second planetary gear sets each having a sun gear, carrier member and ring gear.

In yet another embodiment of the transmission, the input member is continuously interconnected with the second gear of the first external gear set and the output member is continuously interconnected with the ring gear of the second planetary gear set.

In yet another embodiment of the transmission, the first, second and third co-planar gear sets each having a first gear and a second gear.

In yet another embodiment of the transmission, a first interconnecting member continuously interconnects the ring gear of the first planetary gear set with the second gear of the second torque transfer assembly.

In yet another embodiment of the transmission, a second interconnecting member continuously interconnects the carrier member of the first planetary gear set with the second gear of the third torque transfer assembly.

In yet another embodiment of the transmission, a third interconnecting member continuously interconnects the sun gear of the second planetary gear set with the first gear of the second torque transfer assembly.

In still another embodiment of the transmission, a first torque transmitting mechanism is selectively engageable to interconnect the sun gear of the first planetary gear set with the second gear of the second torque transfer assembly.

In still another embodiment of the transmission, a second torque transmitting mechanism is selectively engageable to interconnect the carrier member of the second planetary gear set with at least one of the first gear of the first torque transfer assembly and the input member.

In still another embodiment of the transmission, a third torque transmitting mechanism is selectively engageable to interconnect the sun gear of the second planetary gear set with the first gear of the third torque transfer assembly.

In still another embodiment of the transmission, a third torque transmitting mechanism selectively engageable to interconnect the second gear of the second co-planar gear set with the second gear of the third co-planar gear set.

In still another embodiment of the transmission, a fourth torque transmitting mechanism is selectively engageable to interconnect the first gear of the third torque transfer assembly with at least one of the ring gear of the second planetary gear set and the output member.

In still another embodiment of the transmission, a fifth torque transmitting mechanism is selectively engageable to interconnect the sun gear of the first planetary gear set with the stationary member.

In still another embodiment of the transmission, a sixth torque transmitting mechanism selectively engageable to interconnect the carrier member of the second planetary gear set with the stationary member.

In still another embodiment of the transmission, the torque transmitting mechanisms are each selectively engageable in combinations of at least three to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 2:
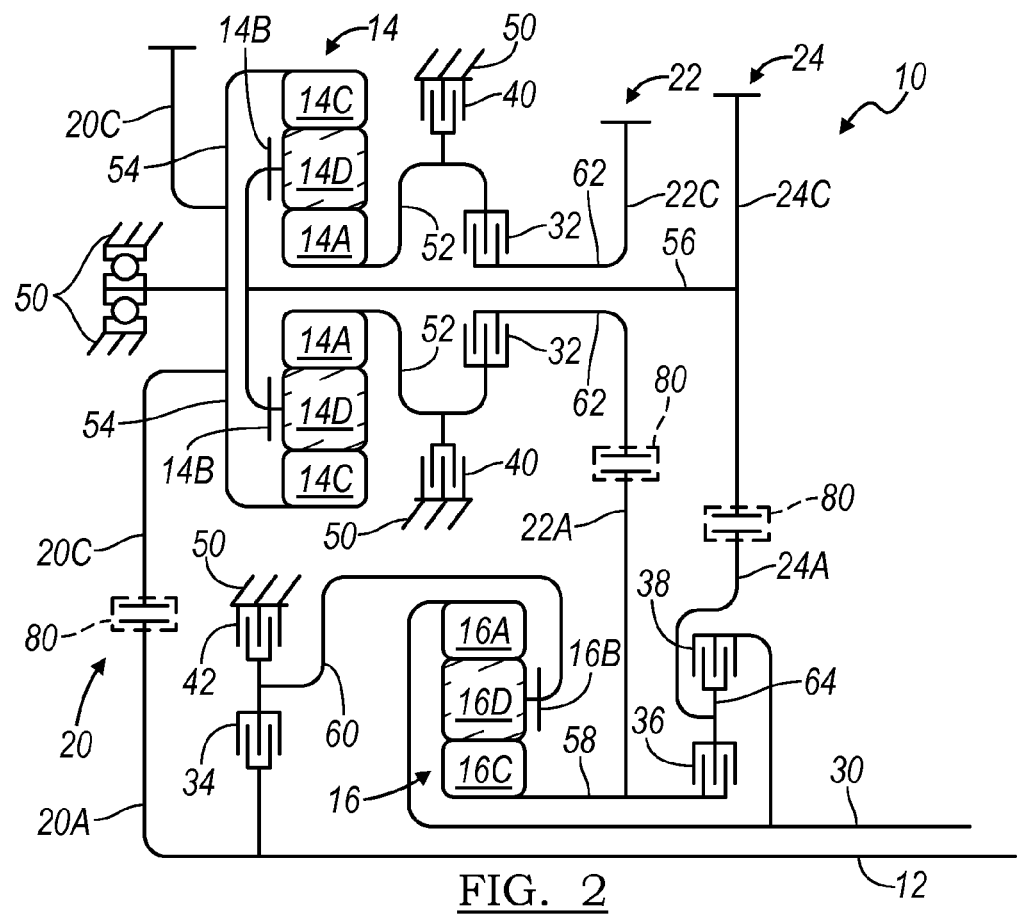
FIG. 2 is a diagrammatic view of an embodiment of an eight speed transmission according to the present invention.
Figure 4:
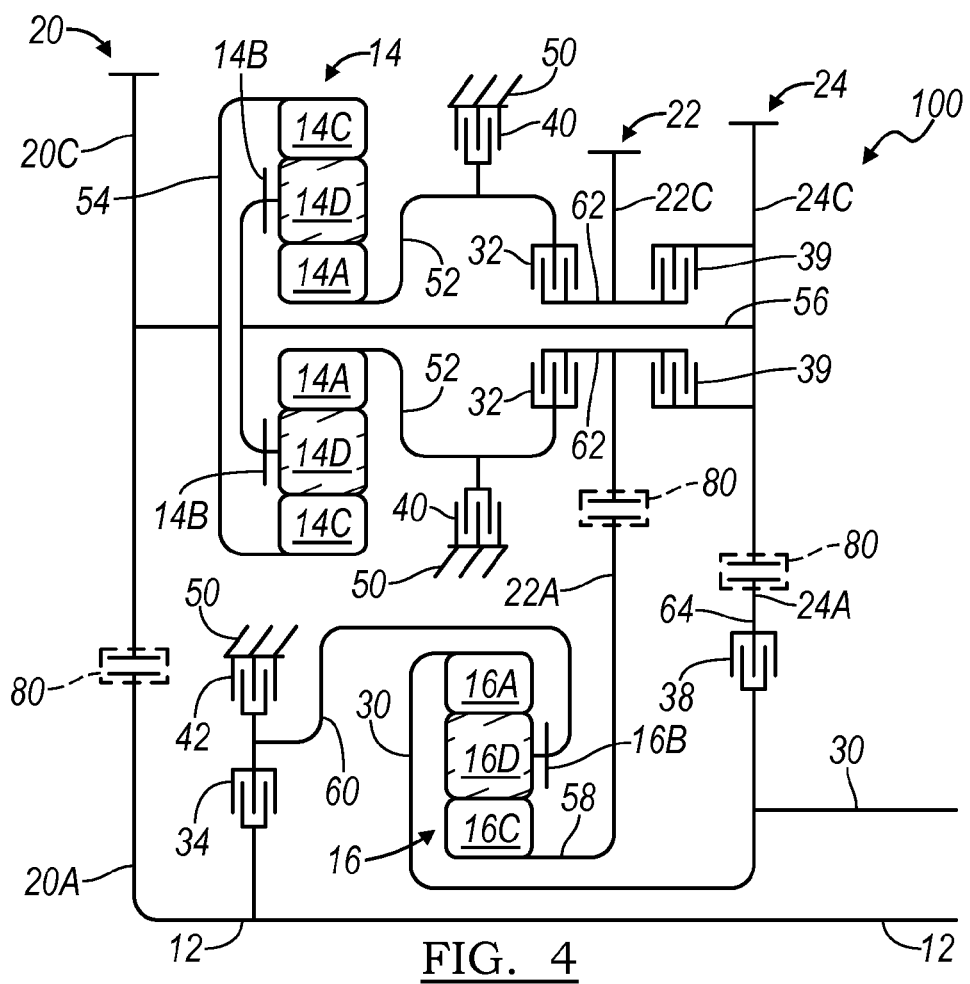
FIG. 4 is a diagrammatic view of the embodiment of an eight speed transmission corresponding to the lever diagram shown in FIG. 3 according to the present invention.
Figure 5:
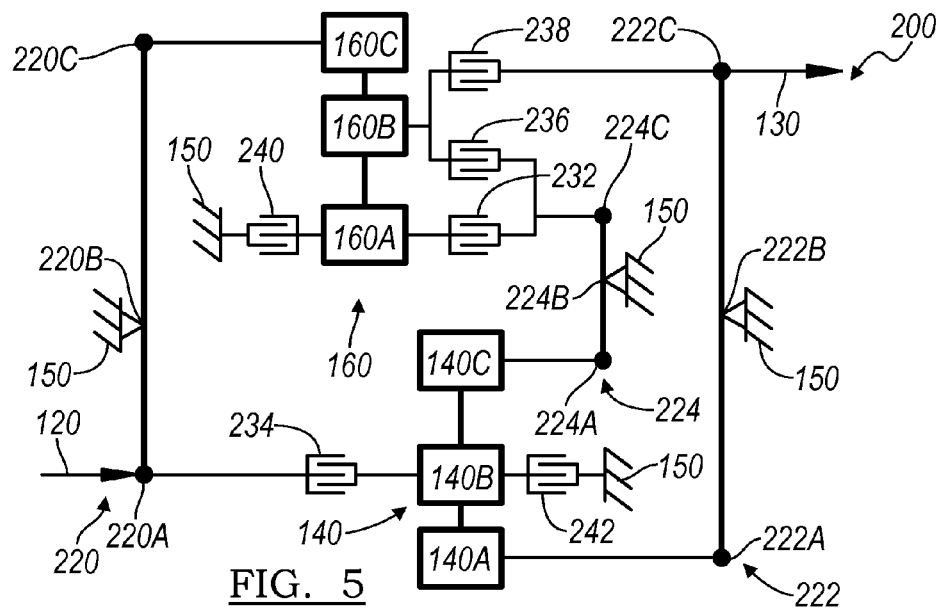
Figure 6:
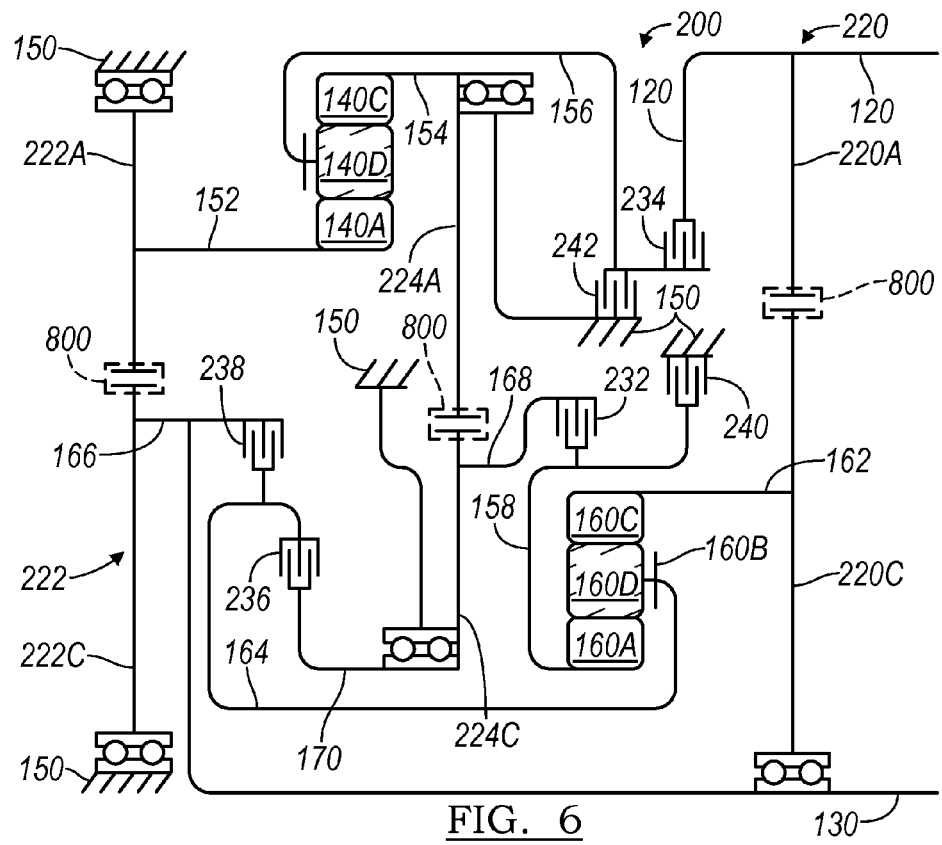

FIG. 5 is a lever diagram of another embodiment of an eight speed transmission according to the present invention; and FIG. 6 is a diagrammatic view of the embodiment of an eight speed transmission corresponding to the lever diagram shown in FIG. 5 according to the present invention; and FIG. 7 is a truth table presenting the state of engagement of the various torque transmitting elements in each of the available forward and reverse speeds or gear ratios of the transmission illustrated in FIGS. 2, 4, and 6.

DETAILED DESCRIPTION

The following description is merely exemplary in nature and is not intended to limit the present disclosure, application, or uses.

Figure 1:
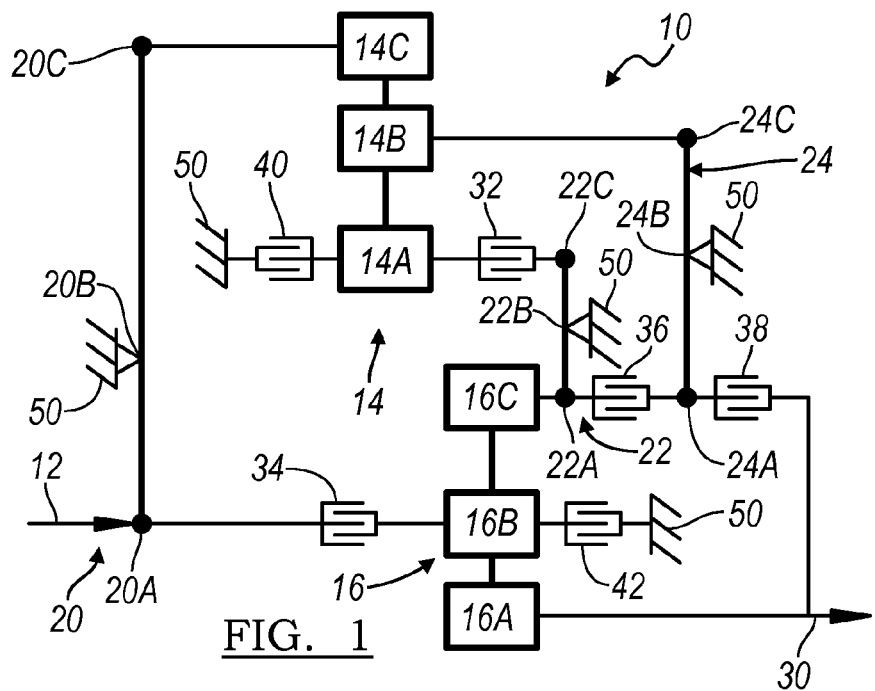
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a gear set. Solid line levers represent a planetary gear set wherein the three basic mechanical components of the planetary gear set are each represented by a node. Therefore, a single planetary gear set lever contains three nodes: one for the sun gear, one for the planet gear carrier, and one for the ring gear. Dashed line levers are spur or external drive gear sets which may be represented in the lever diagram as planetary gear sets having grounded planet carrier members. Accordingly, the outer nodes represent the first and second drive gears and the inner node represents the imaginary grounded planet carrier member. The relative length between the nodes of each lever can be used to represent the ring-to-sun ratio and first drive gear to second drive gear ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. Where the torque transmitting device is a brake, one set of interleaved fingers is coupled to a ground. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C and a first external or co-planar gear set 20 having three nodes: a first node 20A, a second node 20B and a third node 20C, a second external or co-planar gear set 22 having three nodes: a first node 22A, a second node 22B and a third node 22C and a third external or co-planar gear set 24 having three nodes: a first node 24A, a second node 24B and a third node 24C and an output shaft or member 30.

The input member 12 is coupled to the first node 20A of the first external gear set 20. The output member 30 is coupled to the first node 16A of the second planetary gear set 16. The third node 14C of the first planetary gear set 14 is coupled to the third node 20C of the first external gear set 20. The second node 14B of the first planetary gear set 14 is coupled to the third node 24C of the third external gear set 24. The third node 16C of the second planetary gear set 16 is coupled to a first node 22A of a second external gear set 22.

A first clutch 32 selectively connects the second node 14A of the first planetary gear set 14 to the third node 22C of the second external gear set 22. A second clutch 34 selectively connects second node 16B of the second planetary gear set 16 to the first node 20A the first external gear set 20. A third clutch 36 selectively connects the first node 22A of the second external gear set 22 to the first node 24A of the third external gear set 24. A fourth clutch 38 selectively connects the first node 24A of the third external gear set 24 to the first node 16A of the second planetary gear set 16 and to the output member or shaft 30. A first brake 40 selectively connects the first node 14A of the first planetary gear set 14 to a stationary member or transmission housing 50. A second brake 42 selectively connects the second node 16B of the second planetary gear set 16 to a stationary member or transmission housing 50.

Referring now to FIG. 2, a schematic diagram illustrates an embodiment of the eight speed transmission 10 according to the present invention. In FIG. 2, the numbering from the lever diagram of FIG. 1 is carried over. The clutches, brake and couplings or interconnections are correspondingly presented whereas the nodes of the planetary gear sets now appear as components of planetary gear sets such as sun gears, ring gears, planet gears and planet gear carriers and the nodes of the external or co-planar gear sets now appear as components of the external drive gear sets such as first and second drive or transfer gears or sprockets.

For example, planetary gear set 14 includes a sun gear member 14A, a planet gear carrier member 14B and a ring gear member 14C. The planet gear carrier member 14B rotatably supports a set of planet gears 14D configured to intermesh with both the sun gear member 14A and the ring gear member 14C. The sun gear member 14A is connected for common rotation with a first shaft or interconnecting member 52. The ring gear member 14C is connected for common rotation with a second shaft or interconnecting member 54. The planet carrier member 14B is connected for common rotation with a third shaft or interconnecting member 56.

The planetary gear set 16 includes a sun gear member 16C, a planet gear carrier member 16B and a ring gear member 16A. The planet gear carrier member 16B rotatably supports a set of planet gears 16D configured to intermesh with both the sun gear member 16C and the ring gear member 16A. The sun gear member 16C is connected for common rotation with a fourth shaft or interconnecting member 58. The ring gear member 16A is connected for common rotation with the output shaft or member 30. The planet carrier member 16B is connected for common rotation with a fifth shaft or interconnecting member 60.

The external or co-planar gear set 20 includes a first gear or gear member 20A intermeshed with a second gear or gear member 20C. The first gear member 20A is connected for common rotation with the input shaft or member 12. The second gear member 20C is connected for common rotation with the second shaft or interconnecting member 54.

The external or co-planar gear set 22 includes a first gear or gear member 22A intermeshed with a second gear or gear member 22C. The first gear member 22A is connected for common rotation with the fourth shaft or interconnecting member 58. The second gear member 22C is connected for common rotation with a sixth shaft or interconnecting member 62.

The external or co-planar gear set 24 includes a first gear or gear member 24A intermeshed with a second gear or gear member 24C. The first gear member 24A is connected for common rotation with a seventh shaft or interconnecting member 64. The second gear member 24C is connected for common rotation with the third shaft or interconnecting member 56.

The input shaft or member 12 is continuously connected to an engine (not shown) or to a turbine of a torque converter (not shown). The output shaft or member 30 is continuously connected with the final drive unit or transfer case (not shown).

In an alternative embodiment of the present invention, coplanar gear sets 20, 22 and 24 are each replaced by sprocket sets and a chain or belt (represented by the dashed boxes labeled 80 in FIGS. 2 and 4). More specifically, in the instant embodiment each of the first gear members 20A 22A and 24A are replaced by first sprockets and each of the second gear members 20C, 22C and 24C are replaced by second sprockets. Moreover, the torque transfer chain is provided for each gear or sprocket set 20, 22 and 24. Each of the torque transfer chains mesh with each of the first and second sprockets of each of the gear or sprocket sets to transfer torque between the sprockets.

The torque-transmitting elements or the clutches 32, 34, 36, 38 and first brake 40 and second brake 42 allow for selective interconnection of the shafts or interconnecting members, members of the planetary gear sets and external gear sets, and the transmission housing. For example, the first clutch 32 is selectively engageable to connect the first shaft or interconnecting member 52 with the sixth shaft or interconnecting member 62. The second clutch 34 is selectively engageable to connect the input shaft or member 12 with the fifth shaft or interconnecting member 60. The third clutch 36 is selectively engageable to connect the fourth shaft or interconnecting member 58 with the seventh shaft or interconnecting member 64. The fourth clutch 38 is selectively engageable to connect the output shaft or member 30 with the seventh shaft or interconnecting member 64. The first brake 40 is selectively engageable to connect the first shaft or interconnecting member 52 to a stationary element the transmission housing 50 in order to restrict member 52 from rotating relative to the transmission housing 50. The second brake 42 is selectively engageable to connect the fifth shaft or interconnecting member 60 to the stationary element or the transmission housing 50 in order to restrict member 60 from rotating relative to the transmission housing 50.

In the particular example provided, the transmission 10 is arranged along two parallel and spaced apart axes including a first axis defined by the input member 12 and a second axis defined by the third shaft or interconnecting member 56. Accordingly, in the example provided, the second planetary gear set 16, first gear members 20A, 22A and 24A, the clutches 34, 36 and 38 and the second brake 42 are all coaxial with the first axis. Moreover, the first planetary gear set 14, the second gear members 20C, 22C and 24C, the clutch 32 and first brake 40 are all coaxial with the second axis.

Figure 3:
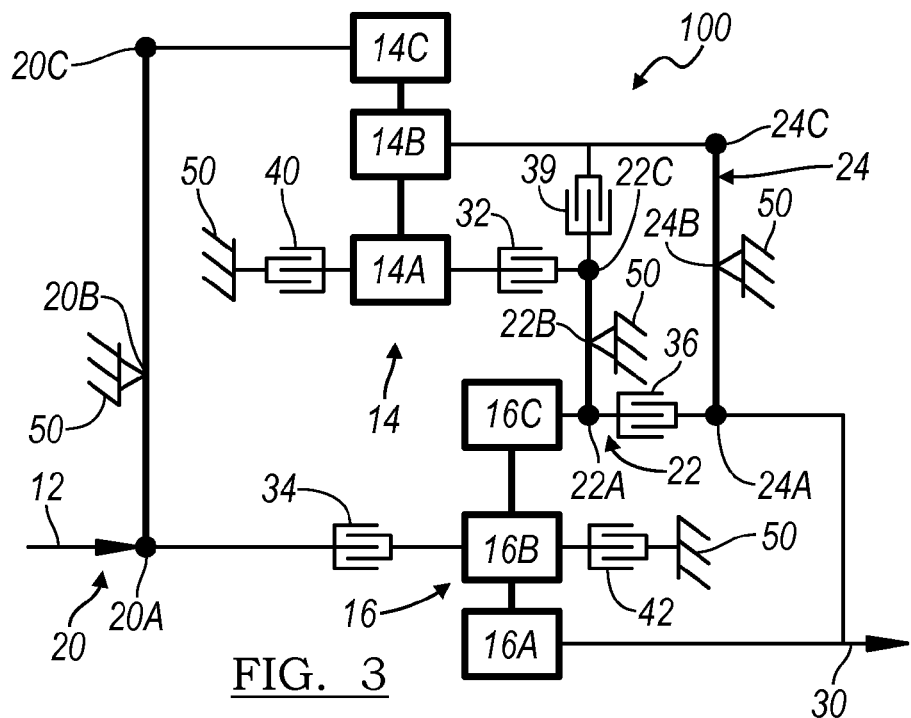
FIG. 3 is a lever diagram of another embodiment of an eight speed transmission according to the present invention.

Referring now to FIG. 3, an alternate embodiment of an eight speed transmission of the present invention is provided and illustrated in a lever diagram format as transmission 100. The transmission 100 includes the input shaft or member 12, the first planetary gear set 14 having the three nodes: the first node 14A, the second node 14B and the third node 14C, the second planetary gear set 16 having the three nodes: the first node 16A, the second node 16B and the third node 16C, the first external gear set 20 having the three nodes: the first node 20A, the second node 20B and the third node 20C, the second external gear set 22 having the three nodes: the first node 22A, the second node 22B and the third node 22C, the third external gear set 24 having the three nodes: the first node 24A, the second node 24B and the third node 24C and the output shaft or member 30. Moreover the clutches 32, 34, 36 and brakes 40 and 42 are also included in the present embodiment and selectively connect the same components as in the previous embodiment. However, in the instant embodiment clutch 36 is eliminated and a new clutch 39 is added. Clutch 39 selectively connects the second node 14B of the first planetary gear set 14 and the second gear member 24C of the third external gear set 24 to the second gear member 22C of the second external gear set 22.

Referring now to FIG. 4, a schematic diagram illustrates the embodiment of the eight speed transmission 100 associated with the lever diagram shown in FIG. 3, in accordance with the present invention. In FIG. 4, the numbering from the lever diagram of FIG. 3 is carried over. The clutches, brake and couplings or interconnections are correspondingly presented whereas the nodes of the planetary gear sets now appear as components of planetary gear sets such as sun gears, ring gears, planet gears and planet gear carriers and the nodes of the external drive gear sets now appear as components of the external drive gear sets such as first and second drive or transfer gears or sprockets.

In the particular example provided, the transmission 100 includes a clutch 39 that is not present or provided in the previous embodiment of transmission 10. Accordingly, clutch 39 selectively connects the carrier member 14B of the first planetary gear set 14 and the second gear 24C of the third external gear set 24 to the second gear 22C of the second external gear set 22.

Referring now to FIG. 5, another embodiment of an eight speed transmission 200 is illustrated in a lever diagram format. The transmission 200 includes an input shaft or member 120, a first planetary gear set 140 having three nodes: a first node 140A, a second node 140B and a third node 140C, a second planetary gear set 160 having three nodes: a first node 160A, a second node 160B and a third node 160C and a first external gear set 220 having three nodes: a first node 220A, a second node 220B and a third node 220C, a second external gear set 222 having three nodes: a first node 222A, a second node 222B and a third node 222C and a third external gear set 224 having three nodes: a first node 224A, a second node 224B and a third node 224C and an output shaft or member 130.

The input member 120 is coupled to the first node 220A of the first external gear set 220. The output member 130 is coupled to the third node 222C of the second planetary gear set 222. The first node 140A of the first planetary gear set 140 is coupled to the first node 222A of the second external gear set 222. The third node 140C of the first planetary gear set 140 is coupled to the first node 224A of the third external gear set 224. The third node 160C of the second planetary gear set 160 is coupled to a third node 220C of a first external gear set 220.

A first clutch 232 selectively connects the first node 160A of the second planetary gear set 160 to the third node 224C of the third external gear set 224. A second clutch 234 selectively connects second node 140B of the first planetary gear set 140 to the first node 220A the first external gear set 220. A third clutch 236 selectively connects the second node 160B of the second planetary gear set 160 to the third node 224C of the third external gear set 224. A fourth clutch 238 selectively connects the third node 222C of the second external gear set 222 and to the output member or shaft 130 to the second node 160B of the second planetary gear set 160. A first brake 240 selectively connects the first node 160A of the second planetary gear set 160 to a stationary member or transmission housing 150. A second brake 242 selectively connects the second node 140B of the first planetary gear set 140 to a stationary member or transmission housing 150.

Referring now to FIG. 6, a schematic diagram illustrates an embodiment of the eight speed transmission 10 according to the present invention. In FIG. 6, the numbering from the lever diagram of FIG. 5 is carried over. The clutches, brake and couplings or interconnections are correspondingly presented whereas the nodes of the planetary gear sets now appear as components of planetary gear sets such as sun gears, ring gears, planet gears and planet gear carriers and the nodes of the external drive gear sets now appear as components of the external drive gear sets such as first and second drive or transfer gears or sprockets.

For example, planetary gear set 140 includes a sun gear member 140A, a planet gear carrier member 140B and a ring gear member 140C. The planet gear carrier member 140B rotatably supports a set of planet gears 140D configured to intermesh with both the sun gear member 140A and the ring gear member 140C. The sun gear member 140A is connected for common rotation with a first shaft or interconnecting member 152. The ring gear member 140C is connected for common rotation with a second shaft or interconnecting member 154. The planet carrier member 140B is connected for common rotation with a third shaft or interconnecting member 156.

The planetary gear set 160 includes a sun gear member 160A, a planet gear carrier member 160B and a ring gear member 160C. The planet gear carrier member 160B rotatably supports a set of planet gears 160D configured to intermesh with both the sun gear member 160A and the ring gear member 160C. The sun gear member 160A is connected for common rotation with a fourth shaft or interconnecting member 158. The ring gear member 160C is connected for common rotation with a fifth shaft or interconnecting member 162. The planet carrier member 160B is connected for common rotation with a sixth shaft or interconnecting member 164.

The external or co-planar gear set 220 includes a first gear or gear member 220A intermeshed with a second gear or gear member 220C. The first gear member 220A is connected for common rotation with the input shaft or member 120. The second gear member 220C is connected for common rotation with the fifth shaft or interconnecting member 162.

The external or co-planar gear set 222 includes a first gear or gear member 222A intermeshed with a second gear or gear member 222C. The first gear member 222A is connected for common rotation with the first shaft or interconnecting member 152. The second gear member 222C is connected for common rotation with a seventh shaft or interconnecting member 166 and the output member or shaft 130.

The external or co-planar gear set 224 includes a first gear or gear member 224A intermeshed with a second gear or gear member 224C. The first gear member 224A is connected for common rotation with the second shaft or interconnecting member 154. The second gear member 224C is connected for common rotation with an eighth shaft or interconnecting member 168 and with a ninth shaft or interconnecting member 170.

The input shaft or member 120 is continuously connected to an engine (not shown) or to a turbine of a torque converter (not shown). The output shaft or member 130 is continuously connected with the final drive unit or transfer case (not shown).

In an alternative embodiment of the present invention, coplanar gear sets 200, 220 and 240 are each replaced by sprocket sets and a chain or belt (represented by the dashed boxes labeled 800 in FIG. 6). More specifically, in the instant embodiment each of the first gear members 200A, 220A and 240A are replaced by first sprockets and each of the second gear members 200C, 220C and 240C are replaced by second sprockets. Moreover, the torque transfer chain is provided for each gear or sprocket set 200, 220 and 240. Each of the torque transfer chains mesh with each of the first and second sprockets of each of the gear or sprocket sets to transfer torque between the sprockets.

The torque-transmitting elements or the clutches 232, 234, 236, 238 and first brake 240 and second brake 242 allow for selective interconnection of the shafts or interconnecting members, members of the planetary gear sets and external gear sets, and the transmission housing. For example, the first clutch 232 is selectively engageable to connect the fourth shaft or interconnecting member 158 with the seventh shaft or interconnecting member 168. The second clutch 234 is selectively engageable to connect the input shaft or member 120 with the third shaft or interconnecting member 156. The third clutch 236 is selectively engageable to connect the sixth shaft or interconnecting member 164 with the ninth shaft or interconnecting member 170. The fourth clutch 238 is selectively engageable to connect the sixth shaft or interconnecting member 164 with the seventh shaft or interconnecting member 166. The first brake 240 is selectively engageable to connect the fourth shaft or interconnecting member 158 to a stationary element or the transmission housing 150 in order to restrict member 158 from rotating relative to the transmission housing 150. The second brake 242 is selectively engageable to connect the third shaft or interconnecting member 156 to the stationary element or the transmission housing 150 in order to restrict member 156 from rotating relative to the transmission housing 150.

In the particular example provided, the transmission 200 is arranged along two parallel and spaced apart axes including a first axis defined by the input member 120 and a second axis defined by the output shaft or member 130. Accordingly, in the example provided, the first planetary gear set 140, first gear members 220A, 222A and 224A, the clutches 234 and the second brake 242 are all coaxial with the first axis. Moreover, the second planetary gear set 160, the second gear members 220C, 222C and 224C, the clutch 232, 236, 238 and first brake 240 are all coaxial with the second axis.

It will be appreciated that the foregoing explanation of operation and gear states of the eight speed transmissions 10 and 200 assumes, first of all, that all the clutches and the brake not specifically referenced in a given gear state are inactive or disengaged and, second of all, that during gear shifts, i.e., changes of gear state, between at least adjacent gear states, a clutch or brake engaged or activated in both gear states will remain engaged or activated.

Referring now to FIG. 7, the operation of the embodiments of the eight speed transmissions 10, 100 and 200 will be described. It will be appreciated that the transmissions 10, 100 and 200 is capable of transmitting torque from the input shaft or member to the output shaft or member in at least eight forward speed or torque ratios and at least one reverse speed or torque ratio. Each forward and reverse speed or torque ratio is attained by engagement of one or more of the torque-transmitting mechanisms, as will be explained below. FIG. 7 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmissions. An example of the gear ratios that may be obtained using the embodiments of the present invention are also shown in FIG. 7. Of course, other gear ratios are achievable depending on the gear diameter, gear teeth count and gear configuration selected.

Accordingly, transmission 10 establishes a reverse gear, by engaging or activating the first clutch 32, the third clutch 36 and the second brake 42. The first clutch 32 connects the first shaft or interconnecting member 52 with the sixth shaft or interconnecting member 62. The third clutch 36 connects the fourth shaft or interconnecting member 58 with the seventh shaft or interconnecting member 64. The second brake 42 connects the fifth shaft or interconnecting member 60 to the stationary element or the transmission housing 50 in order to restrict member 60 from rotating relative to the transmission housing 50. Likewise, the eight forward ratios of transmission 10 are achieved through different combinations of clutch and brake engagements, as shown in FIG. 7.

Transmission 100 establishes a reverse gear, by engaging or activating the first clutch 32, the third clutch 39 and the second brake 42. The first clutch 32 connects the first shaft or interconnecting member 52 with the sixth shaft or interconnecting member 62. The third clutch 39 connects the carrier member 14B of the first planetary gear set 14 and the second gear 24C of the third external gear set 24 to the second gear 22C of the second external gear set 22. The second brake 42 connects the fifth shaft or interconnecting member 60 to the stationary element or the transmission housing 50 in order to restrict member 60 from rotating relative to the transmission housing 50. Likewise, the eight forward ratios of transmission 100 are achieved through different combinations of clutch and brake engagements, as shown in FIG. 7.

Transmission 200 establishes a reverse gear, by engaging or activating the first clutch 232, the third clutch 236 and the second brake 242. The first clutch 232 connects the fourth shaft or interconnecting member 158 with the seventh shaft or interconnecting member 168. The third clutch 236 connects the sixth shaft or interconnecting member 164 with the ninth shaft or interconnecting member 170. The second brake 242 connects the fourth shaft or interconnecting member 158 to a stationary element or the transmission housing 150 in order to restrict member 158 from rotating relative to the transmission housing 150. Likewise, the eight forward ratios of transmission 200 are achieved through different combinations of clutch and brake engagements, as shown in FIG. 7.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
an input member;
an output member;
a first and second planetary gear sets each having a first, a second and a third member;
a first, a second and a third torque transfer assembly each having a first member and a second member;
a first interconnecting member continuously interconnecting the third member of the first planetary gear set with the second member of the first torque transfer assembly;
a second interconnecting member continuously interconnecting the second member of the first planetary gear set with the second member of the third torque transfer assembly;
a third interconnecting member continuously interconnecting the third member of the second planetary gear set with the first member of the second torque transfer assembly; and
six torque transmitting mechanisms each selectively engageable to interconnect at least one of the first members, the second members, the third members of the planetary gear sets, the first members and the second members of the torque transfer assemblies with at least one other of the first members, the second members, the third members of the planetary gear sets, the first members, the second members of the torque transfer assemblies and a stationary member, and wherein the six torque transmitting mechanisms are each selectively engageable in combinations of at least three to establish at least eight forward speed ratios and at least one reverse speed ratio between the input member and the output member.

2. The transmission of claim 1 wherein a first of the six torque transmitting mechanisms is selectively engageable to interconnect the first member of the first planetary gear set with the second member of the second torque transfer assembly.

3. The transmission of claim 2 wherein a second of the six torque transmitting mechanisms is selectively engageable to interconnect the second member of the second planetary gear set with at least one of the first member of the first torque transfer assembly and the input member.

4. The transmission of claim 3 wherein a third of the six torque transmitting mechanisms is selectively engageable to interconnect the third member of the second planetary gear set with the first member of the third torque transfer assembly.

5. The transmission of claim 4 wherein a fourth of the six torque transmitting mechanisms is selectively engageable to interconnect the first member of the third torque transfer assembly with at least one of the first member of the second planetary gear set and the output member.

6. The transmission of claim 5 wherein a fifth of the six torque transmitting mechanisms is selectively engageable to interconnect the first member of the first planetary gear set with the stationary member.

7. The transmission of claim 6 wherein a sixth of the six torque transmitting mechanisms is selectively engageable to interconnect the second member of the second planetary gear set with the stationary member.

8. The transmission of claim 1 wherein the input member is continuously interconnected with the first member of the first torque transfer assembly and wherein the output member is continuously interconnected with the first member of the second planetary gear set.

9. The transmission of claim 1 wherein the first member of the first planetary gear set and the third member of the second planetary gear set are sun gears, the second members of the first and second planetary gear sets are carrier members and the third member of the first planetary gear set and first member of the second planetary gear set are ring gears.

10. The transmission of claim 1 wherein the stationary member is a transmission housing.

11. The transmission of claim 1 wherein the first and the second torque transfer assemblies each include a first and a second sprocket.

12. The transmission of claim 11 wherein the first and the second torque transfer assemblies each further comprise a third member, wherein the third member is a chain for coupling the first and the second sprocket to transfer torque there between.

13. A transmission comprising:
an input member;
an output member;
a first, second and third co-planar gear sets each having a first member and a second member;
a first and a second planetary gear set each having a first, a second and a third member, wherein the input member is continuously interconnected with the first member of the first co-planar gear set and wherein the output member is continuously interconnected with the first member of the second planetary gear set;
a first interconnecting member continuously interconnecting the third member of the first planetary gear set with the second member of the first co-planar gear set;
a second interconnecting member continuously interconnecting the second member of the first planetary gear set with the second member of the third co-planar gear set;

a third interconnecting member continuously interconnecting the third member of the second planetary gear set with the first member of the second co-planar gear set;

a first torque transmitting mechanism selectively engageable to interconnect the first member of the first planetary gear set with the second member of the second co-planar gear set;

a second torque transmitting mechanism selectively engageable to interconnect the second member of the second planetary gear set with at least one of the first member of the first co-planar gear set and the input member;

a third torque transmitting mechanism selectively engageable to interconnect the third member of the second planetary gear set with the first member of the third co-planar gear set;

a fourth torque transmitting mechanism selectively engageable to interconnect the first member of the third co-planar gear set with at least one of the first member of the second planetary gear set and the output member;

a fifth torque transmitting mechanism selectively engageable to interconnect the first member of the first planetary gear set with a stationary member;

a sixth torque transmitting mechanism selectively engageable to interconnect the second member of the second planetary gear set with the stationary member, and wherein the torque transmitting mechanisms are each selectively engageable in combinations of at least three to establish at least eight forward speed ratios and at least one reverse speed ratio between the input member and the output member.

14. The transmission of claim 13 wherein the first member of the first planetary gear set and the third member of the second planetary gear set are sun gears, the second members of the first and second planetary gear sets are carrier members and the third member of the first planetary gear set and first member of the second planetary gear set are ring gears.

15. The transmission of claim 13 wherein the stationary member is a transmission housing.

16. The transmission of claim 13 wherein the first and the second members of the first and the second co-planar gear sets are a first and a second intermeshing gear.

17. The transmission of claim 13 wherein the first and the second members of the first and the second co-planar gear sets are a first and a second sprocket.

18. The transmission of claim 17 wherein the first and the second co-planar gear sets each further comprise a third member, wherein the third member is a chain for coupling the first and the second sprockets to transfer torque there between.

19. A transmission comprising:

an input member;

an output member;

a first, second and third co-planar gear sets each having a first gear and a second gear;

a first and a second planetary gear set each having a sun gear, a carrier member and a ring gear, wherein the input member is continuously interconnected with the first gear of the co-planar gear set and wherein the output member is continuously interconnected with the ring gear of the second planetary gear set;

a first interconnecting member continuously interconnecting the ring gear of the first planetary gear set with the second gear of the first co-planar gear set;

a second interconnecting member continuously interconnecting the carrier member of the first planetary gear set with the second gear of the third co-planar gear set;

a third interconnecting member continuously interconnecting the sun gear of the second planetary gear set with the first gear of the second co-planar gear set;

a first torque transmitting mechanism selectively engageable to interconnect the sun gear of the first planetary gear set with the second gear of the second co-planar gear set;

a second torque transmitting mechanism selectively engageable to interconnect the carrier member of the second planetary gear set with at least one of the first gear of the first co-planar gear set and the input member;

a third torque transmitting mechanism selectively engageable to interconnect the sun gear of the second planetary gear set with the first gear of the third co-planar gear set;

a fourth torque transmitting mechanism selectively engageable to interconnect the first gear of the third co-planar gear set with at least one of the ring gear of the second planetary gear set and the output member;

a fifth torque transmitting mechanism selectively engageable to interconnect the sun gear of the first planetary gear set with a stationary member;

a sixth torque transmitting mechanism selectively engageable to interconnect the carrier member of the second planetary gear set with the stationary member, and wherein the torque transmitting mechanisms are each selectively engageable in combinations of at least three to establish at least eight forward speed ratios and at least one reverse speed ratio between the input member and the output member.

20. A transmission comprising:

an input member;

an output member;

a first, second and third co-planar gear sets each having a first gear and a second gear;

a first and a second planetary gear set each having a sun gear, a carrier member and a ring gear, wherein the input member is continuously interconnected with the first gear of the first co-planar gear set and wherein the output member is continuously interconnected with the second gear of the second co-planar gear set;

a first interconnecting member continuously interconnecting the ring gear of the first planetary gear set with the first gear of the third co-planar gear set;

a second interconnecting member continuously interconnecting the sun gear of the first planetary gear set with the first gear of the second co-planar gear set;

a third interconnecting member continuously interconnecting the ring gear of the second planetary gear set with the second gear of the first co-planar gear set;

a first torque transmitting mechanism selectively engageable to interconnect the sun gear of the second planetary gear set with the second gear of the third co-planar gear set;

a second torque transmitting mechanism selectively engageable to interconnect the carrier member of the first planetary gear set with at least one of the first gear of the first co-planar gear set and the input member;

a third torque transmitting mechanism selectively engageable to interconnect the carrier member of the second planetary gear set with the second gear of the third co-planar gear set;
a fourth torque transmitting mechanism selectively engageable to interconnect the second gear of the second co-planar gear set with the carrier member of the second planetary gear set;
a fifth torque transmitting mechanism selectively engageable to interconnect the sun gear of the second planetary gear set with a stationary member;
a sixth torque transmitting mechanism selectively engageable to interconnect the carrier member of the first planetary gear set with the stationary member, and
wherein the torque transmitting mechanisms are each selectively engageable in combinations of at least three to establish at least eight forward speed ratios and at least one reverse speed ratio between the input member and the output member.

* * * * *